US012228041B2

(12) United States Patent
Rawson et al.

(10) Patent No.: US 12,228,041 B2
(45) Date of Patent: Feb. 18, 2025

(54) SYSTEM AND METHOD FOR CLEANING A GAS TURBINE ENGINE AND RELATED WASH STAND

(71) Applicant: General Electric Company, Schenectady, NY (US)

(72) Inventors: Lloyd Eric Rawson, Mason, OH (US); Thomas Tracy Wallace, Loveland, OH (US)

(73) Assignee: General Electric Company, Evendale, OH (US)

( * ) Notice: Subject to any disclaimer, the term of this patent is extended or adjusted under 35 U.S.C. 154(b) by 230 days.

(21) Appl. No.: 17/886,384

(22) Filed: Aug. 11, 2022

(65) Prior Publication Data

US 2022/0412225 A1 Dec. 29, 2022

Related U.S. Application Data

(60) Continuation of application No. 16/558,776, filed on Sep. 3, 2019, now Pat. No. 11,441,446, which is a (Continued)

(51) Int. Cl.
*F01D 25/00* (2006.01)
*B08B 3/00* (2006.01)
(Continued)

(52) U.S. Cl.
CPC ............ *F01D 25/002* (2013.01); *B08B 3/003* (2013.01); *B08B 3/02* (2013.01); *B08B 3/10* (2013.01);
(Continued)

(58) Field of Classification Search
CPC ..................................................... F01D 25/002
See application file for complete search history.

(56) References Cited

U.S. PATENT DOCUMENTS

| | | | |
|---|---|---|---|
| 3,623,668 | A | 11/1971 | Freid |
| 5,868,860 | A | 2/1999 | Asplund |

(Continued)

FOREIGN PATENT DOCUMENTS

| | | | |
|---|---|---|---|
| CN | 1705524 | A | 12/2005 |
| CN | 1976843 | A | 6/2007 |

(Continued)

OTHER PUBLICATIONS

Canadian Office Action Corresponding to CA2953595 on Dec. 18, 2017.

(Continued)

*Primary Examiner* — Spencer E. Bell
(74) *Attorney, Agent, or Firm* — Fitch, Even, Tabin & Flannery LLP

(57) ABSTRACT

A system for cleaning a gas turbine engine may generally include a wash stand having a base frame and a plurality of fluid injection nozzles configured to be supported by the base frame relative to the gas turbine engine. The nozzles may be configured to inject a cleaning fluid through an inlet of the fan casing of the engine as the fan blades are being rotated in a rotational direction such that the cleaning fluid is directed past the rotating fan blades and into a compressor inlet of the engine. Additionally, each nozzle may be oriented at a positive tangential angle defined relative to the rotational direction of the plurality of fan blades. The system may also include a fluid source in flow communication with the wash stand for supplying the cleaning fluid to the plurality of fluid injection nozzles.

19 Claims, 5 Drawing Sheets

Related U.S. Application Data division of application No. 15/001,605, filed on Jan. 20, 2016, now abandoned.

(51) Int. Cl.

| | |
|---|---|
| ***B08B 3/02*** | (2006.01) |
| ***B08B 3/10*** | (2006.01) |
| ***B08B 5/02*** | (2006.01) |
| ***F04D 29/38*** | (2006.01) |
| ***F04D 29/70*** | (2006.01) |

(52) U.S. Cl.
CPC ................ *B08B 5/02* (2013.01); *F04D 29/38* (2013.01); *F04D 29/705* (2013.01)

(56) References Cited

U.S. PATENT DOCUMENTS

| | | | | |
|---|---|---|---|---|
| 6,233,937 | B1 | 5/2001 | Gray | |
| 7,033,979 | B2 | 4/2006 | Herwig | |
| 7,065,955 | B2 | 6/2006 | Reback | |
| 7,373,781 | B2 | 5/2008 | Reback | |
| 7,428,906 | B2 | 9/2008 | Asplund | |
| 7,445,677 | B1 | 11/2008 | Asplund | |
| 7,454,913 | B1 | 11/2008 | Tassone | |
| 7,497,220 | B2 | 3/2009 | Asplund | |
| 7,531,048 | B2 | 5/2009 | Woodcock | |
| 7,815,743 | B2 | 10/2010 | Asplund | |
| 8,028,936 | B2 | 10/2011 | Mcdermott | |
| 8,245,952 | B2 | 8/2012 | Julien | |
| 8,277,647 | B2 | 10/2012 | Rice | |
| 8,303,243 | B2 | 11/2012 | Fish | |
| 8,479,754 | B2 | 7/2013 | Hjerpe | |
| 8,568,860 | B2 | 10/2013 | Maas | |
| 9,023,155 | B2 | 5/2015 | Dorshimer | |
| 9,138,782 | B2 | 9/2015 | Dorshimer | |
| 9,452,848 | B2 | 9/2016 | Mcdermott | |
| 9,657,589 | B2 | 5/2017 | Hjerpe | |
| 9,739,168 | B2 | 8/2017 | Ekanayake | |
| 9,926,517 | B2 | 3/2018 | Tibbetts | |
| 9,932,854 | B1 | 4/2018 | Tibbetts | |
| 9,951,647 | B2 | 4/2018 | Rawson | |
| 9,957,066 | B2 | 5/2018 | Bewlay | |
| 10,005,111 | B2 | 6/2018 | Eriksen | |
| 10,018,113 | B2 | 7/2018 | Bewlay | |
| 10,041,372 | B2 | 8/2018 | Hjerpe | |
| 10,227,891 | B2 | 3/2019 | Eriksen | |
| 10,323,539 | B2 | 6/2019 | Bewlay | |
| 10,377,968 | B2 | 8/2019 | Brooks | |
| 10,385,723 | B2 | 8/2019 | Flynn | |
| 10,634,004 | B2 | 4/2020 | Giljohann | |
| 10,669,885 | B2 | 6/2020 | Pecchiol | |
| 10,920,181 | B2 | 2/2021 | Martin | |
| 11,027,317 | B2 | 6/2021 | Tibbetts | |
| 2002/0170988 | A1 | 11/2002 | Norville | |
| 2004/0028816 | A1 | 2/2004 | Ackerman | |
| 2006/0048796 | A1 | 3/2006 | Asplund | |
| 2008/0040872 | A1 | 2/2008 | Hjerpe | |
| 2008/0087301 | A1 | 4/2008 | Lee | |
| 2008/0149141 | A1 | 6/2008 | Sales | |
| 2009/0260660 | A1 | 10/2009 | Asplund | |
| 2010/0000572 | A1 | 1/2010 | Giljohann | |
| 2010/0200023 | A1 * | 8/2010 | Giljohann | F01D 25/002 134/198 |
| 2011/0197923 | A1 * | 8/2011 | Battaglioli | B08B 9/00 134/169 R |
| 2012/0073263 | A1 | 3/2012 | Kohlenberg | |
| 2013/0298944 | A1 | 11/2013 | Mundinger | |
| 2015/0122292 | A1 | 5/2015 | McDermott | |
| 2015/0159122 | A1 | 6/2015 | Tibbetts | |
| 2017/0165721 | A1 | 6/2017 | Tibbetts | |
| 2017/0167290 | A1 | 6/2017 | Kulkarni | |
| 2017/0191376 | A1 | 7/2017 | Eriksen | |
| 2017/0204739 | A1 | 7/2017 | Rawson | |
| 2017/0254217 | A1 | 9/2017 | Eriksen | |
| 2018/0149038 | A1 | 5/2018 | Eriksen | |
| 2018/0155060 | A1 | 6/2018 | Dauenhauer | |
| 2018/0216036 | A1 | 8/2018 | Tibbetts | |
| 2018/0237163 | A1 | 8/2018 | Bewlay | |
| 2018/0245477 | A1 | 8/2018 | Kulkarni | |
| 2018/0258787 | A1 | 9/2018 | Tibbetts | |
| 2018/0291803 | A1 | 10/2018 | Belay | |
| 2018/0298781 | A1 | 10/2018 | Tibbetts | |
| 2018/0313225 | A1 | 11/2018 | Millhaem | |
| 2018/0331269 | A1 | 11/2018 | Nishide | |
| 2018/0355751 | A1 | 12/2018 | Tibbetts | |
| 2019/0153890 | A1 | 5/2019 | Eriksen | |
| 2019/0323378 | A1 | 10/2019 | Tibbetts | |
| 2020/0141269 | A1 | 5/2020 | Rawson | |
| 2021/0108537 | A1 | 4/2021 | Rigg | |
| 2021/0317752 | A1 | 10/2021 | Deja | |

FOREIGN PATENT DOCUMENTS

| | | | |
|---|---|---|---|
| DE | 102013202616 | | 8/2014 |
| DE | 102013202616 | B4 | 10/2015 |
| DE | 102015006330 | | 11/2016 |
| DE | 102015006330 | B4 | 8/2019 |
| EP | 2286933 | A1 | 2/2011 |
| EP | 2871133 | | 5/2015 |
| WO | 2005120953 | A1 | 12/2005 |
| WO | 2020022474 | | 1/2020 |
| WO | 2020022474 | A1 | 1/2020 |
| WO | 2020030516 | | 2/2020 |
| WO | 2020030516 | A1 | 2/2020 |

OTHER PUBLICATIONS

First Chinese OA1 Corresponding to CN2017100348916 on Apr. 26, 2018.

Second Chinese OA2 Corresponding to CN2017100348916 on Jan. 14, 2019.

Third Chinese OA3 Corresponding to CN2017100348916 on Aug. 19, 2019.

European Search Report Corresponding to EP171512528 on Jul. 28, 2017.

USPTO; U.S. Appl. No. 16/558,776; Notice of Allowance and Fees Due (PTOL-85) mailed May 9, 2022; (pp. 1-8).

* cited by examiner

SYSTEM AND METHOD FOR CLEANING A GAS TURBINE ENGINE AND RELATED WASH STAND

CROSS-REFERENCE TO RELATED APPLICATION

This application is a division of U.S. application Ser. No. 15/001,605 filed Jan. 20, 2016, titled "SYSTEM AND METHOD FOR CLEANING A GAS TURBINE ENGINE AND RELATED WASH STAND," herein incorporated by reference in its entirety.

FIELD OF THE INVENTION

The present subject matter relates generally to gas turbine engines and, more particularly, to a system and method for cleaning a gas turbine engine and a related wash stand to be used when cleaning the engine.

BACKGROUND OF THE INVENTION

A gas turbine engine typically includes a turbomachinery core having a high pressure compressor, combustor, and high pressure turbine in serial flow relationship. The core is operable in a known manner to generate a primary gas flow. The high pressure compressor includes annular arrays ("rows") of stationary vanes that direct air entering the engine into downstream, rotating blades of the compressor. Collectively one row of compressor vanes and one row of compressor blades make up a "stage" of the compressor. Similarly, the high pressure turbine includes annular rows of stationary nozzle vanes that direct the gases exiting the combustor into downstream, rotating blades of the turbine. Collectively one row of nozzle vanes and one row of turbine blades make up a "stage" of the turbine. Typically, both the compressor and turbine include a plurality of successive stages.

With operation of a gas turbine engine, dust, debris and other materials can build-up onto the internal components of the engine over time, which can result in a reduction in the operating efficiency of such components. For example, dust layers and other materials often become baked onto the airfoils of the high pressure compressor. To remove such material deposits, current cleaning methods utilize a single guided hose to inject water into the compressor inlet. Unfortunately, such conventional cleaning methods often provide insufficient cleansing of the compressor airfoils, particularly the airfoils located within the aft stages of the compressor.

Accordingly, an improved system and method for cleaning the interior of a gas turbine engine would be welcomed within the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for cleaning a gas turbine engine, wherein the gas turbine engine includes a plurality of fan blades and a fan casing surrounding the fan blades. The system may generally include a wash stand having a base frame and a plurality of fluid injection nozzles configured to be supported by the base frame relative to the gas turbine engine. The nozzles may be configured to inject a cleaning fluid through an inlet of the fan casing as the fan blades are being rotated in a rotational direction such that the cleaning fluid is directed past the rotating fan blades and into a compressor inlet of the gas turbine engine. Additionally, each nozzle may be oriented at a positive tangential angle defined relative to the rotational direction of the plurality of fan blades. The system may also include a fluid source in flow communication with the wash stand for supplying the cleaning fluid to the plurality of fluid injection nozzles.

In another aspect, the present subject matter is directed to a method for cleaning a gas turbine engine, wherein the gas turbine engine includes a plurality of fan blades and a fan casing surrounding the fan blades. The method may generally include positioning a wash stand relative to the gas turbine engine. The wash stand may include a plurality of fluid injection nozzles configured to be vertically supported at a location adjacent to the gas turbine engine. The method may also include operating the gas turbine engine such that the fan blades are rotated in a rotational direction about a centerline of the gas turbine engine and injecting a cleaning fluid from the nozzles through an inlet of the fan casing as the fan blades are being rotated such that the cleaning fluid is directed past the rotating fan blades and into a compressor inlet of the gas turbine engine. Additionally, each nozzle may be oriented at a positive tangential angle defined relative to the rotational direction of the plurality of fan blades.

These and other features, aspects and advantages of the present invention will be better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
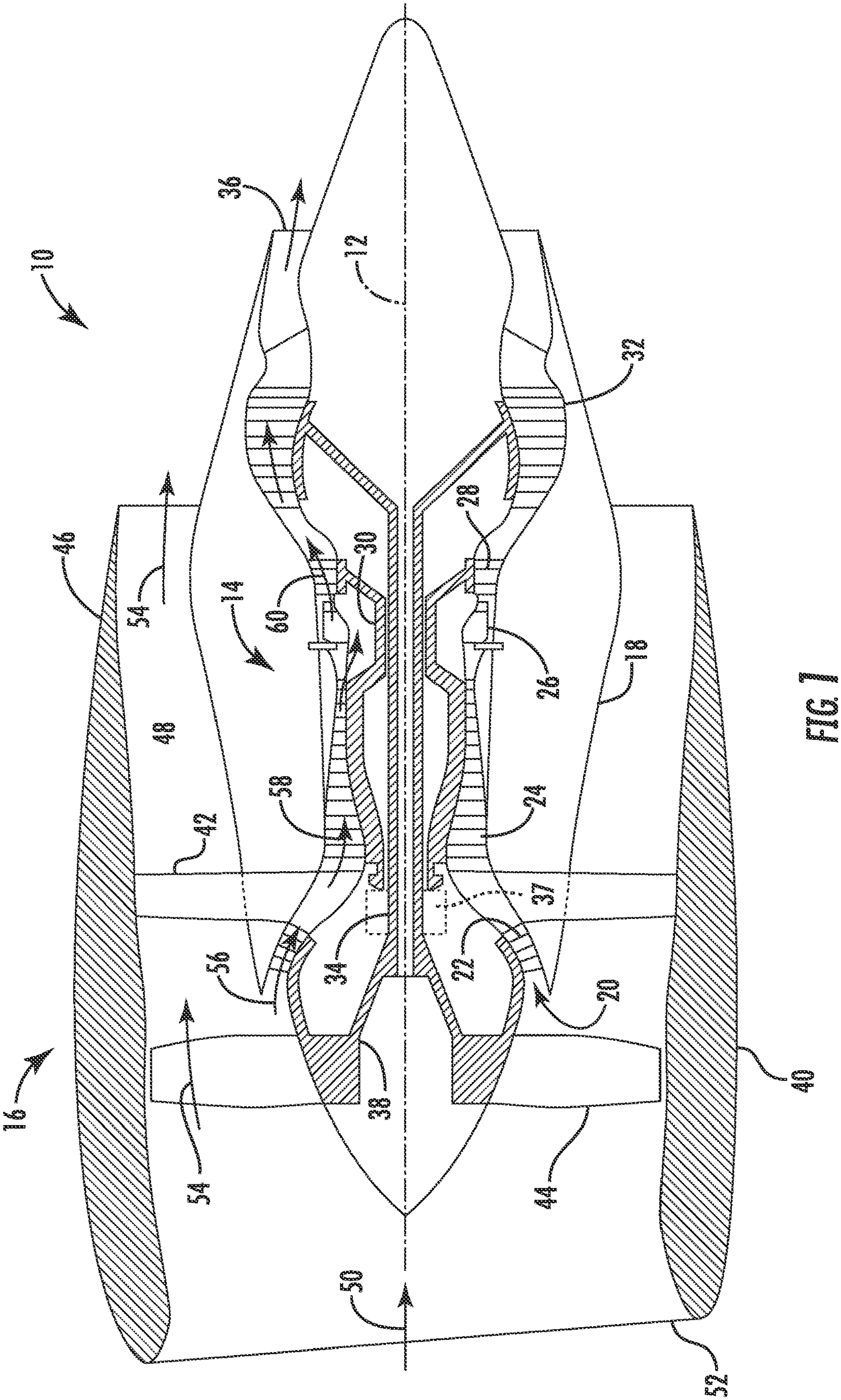
FIG. 1 illustrates a cross-sectional view of one embodiment of a gas turbine engine that may be utilized within an aircraft in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for cleaning a gas turbine engine designed for use within an aircraft. In several embodiments, the disclosed system may include a wash stand having a plurality of fluid injection nozzles configured to inject a high volume of cleaning fluid through the engine fan and into the booster compressor for subsequent delivery to the high pressure compressor of the gas turbine engine. Specifically, the wash stand may be initially positioned adjacent to the front or forward end of the engine, such as by rolling or moving the wash stand to the location of the aircraft or by moving the aircraft to the location of the wash stand. Thereafter, with the engine running, a significant volume of cleaning fluid (e.g., water or any other water-based liquid) may be injected through the fan in a manner that allows the cleaning fluid to be directed into the compressor inlet. The high-volume flow of cleaning fluid may then be directed through the booster compressor and/or the high pressure compressor as the engine is being operated to allow the cleaning fluid to clean the various internal components disposed along the engine's working fluid flow path.

In several embodiments, the orientation of the various nozzles of the wash stand relative to the gas turbine engine may be selected so as to allow the cleaning fluid to be injected past the engine's rotating fan blades and into the compressor inlet. Specifically, as will be described below, the nozzles may be angled relative to the engine centerline such that the cleaning fluid is expelled from the nozzles along a flow path that extends radially inwardly from the nozzle outlets. In addition, the nozzles may have a circumferential or tangential orientation relative to the engine centerline such that each nozzle is configured to expel fluid at a positive tangential angle (as defined based on the rotational direction of the fan blades). As such, as the fan blades rotate with operation of the gas turbine engine, the cleaning fluid expelled from the nozzles may be directed along a positive tangential trajectory that allows the cleaning fluid to flow between the rotating fan blades and into the compressor inlet.

It should be appreciated that the disclosed system and related method may provide numerous advantages for cleaning the interior of a gas turbine engine. For example, given the ability to provide a high-volume, targeted flow of cleaning fluid into the engine core, a greater cleansing effect may be provided for the interior components of the gas turbine engine, such as the airfoils of the high pressure compressor. In addition, given that the cleaning operation is performed while the engine is running, the cleaning fluid directed into the compressor inlet will be heated and pressurized, thereby increasing the likelihood that any material build-up on the interior components of the gas turbine (particularly the aft airfoils of the high pressure compressor) is removed and washed out of the system.

Referring now to the drawings, FIG. 1 illustrates a cross-sectional view of one embodiment of a gas turbine engine 10 that may be utilized within an aircraft in accordance with aspects of the present subject matter, with the engine 10 being shown having a longitudinal or axial centerline axis 12 extending therethrough for reference purposes. In general, the engine 10 may include a core gas turbine engine (indicated generally by reference character 14) and a fan section 16 positioned upstream thereof. The core engine 14 may generally include a substantially tubular outer casing 18 that defines an annular compressor inlet 20. In addition, the outer casing 18 may further enclose and support a booster compressor 22 for increasing the pressure of the air that enters the core engine 14 via the compressor inlet 20 to a first pressure level. A high pressure, multi-stage, axial-flow compressor 24 may then receive the pressurized air from the booster compressor 22 and further increase the pressure of such air. The pressurized air exiting the high-pressure compressor 24 may then flow to a combustor 26 within which fuel is injected into the flow of pressurized air, with the resulting mixture being combusted within the combustor 26. The high energy combustion products are directed from the combustor 26 along the hot gas path of the engine 10 to a first (high pressure) turbine 28 for driving the high pressure compressor 24 via a first (high pressure) drive shaft 30 and then to a second (low pressure) turbine 32 for driving the booster compressor 22 and fan section 16 via a second (low pressure) drive shaft 34 that is generally coaxial with first drive shaft 30. After driving each of turbines 28 and 32, the combustion products may be expelled from the core engine 14 via an exhaust nozzle 36 to provide propulsive jet thrust.

Additionally, as shown in FIG. 1, the fan section 16 of the engine 10 may generally include a rotatable, axial-flow fan rotor assembly 38 that is configured to be surrounded by an annular fan casing 40. It should be appreciated by those of ordinary skill in the art that the fan casing 40 may be configured to be supported relative to the core engine 14 by a plurality of substantially radially-extending, circumferentially-spaced outlet guide vanes 42. As such, the fan casing 40 may enclose the fan rotor assembly 38 and its corresponding fan rotor blades 44. Moreover, a downstream section 46 of the fan casing 40 may extend over an outer portion of the core engine 14 so as to define a secondary, or by-pass, airflow conduit 48 that provides additional propulsive jet thrust.

It should be appreciated that, in several embodiments, the second (low pressure) drive shaft 34 may be directly coupled to the fan rotor assembly 38 to provide a direct-drive configuration. Alternatively, the second drive shaft 34 may be coupled to the fan rotor assembly 38 via a speed reduction device 37 (e.g., a reduction gear or gearbox) to provide an indirect-drive or geared drive configuration. Such a speed reduction device(s) may also be provided between any other suitable shafts and/or spools within the engine 10 as desired or required.

During operation of the engine 10, it should be appreciated that an initial air flow (indicated by arrow 50) may enter the engine 10 through an associated inlet 52 of the fan casing 40. The air flow 50 then passes through the fan blades 44 and splits into a first compressed air flow (indicated by arrow 54) that moves through conduit 48 and a second compressed air flow (indicated by arrow 56) which enters the booster compressor 22 via the compressor inlet 20. The pressure of the second compressed air flow 56 is then increased and enters the high pressure compressor 24 (as indicated by arrow 58). After mixing with fuel and being combusted within the combustor 26, the combustion products 60 exit the combustor 26 and flow through the first turbine 28. Thereafter, the combustion products 60 flow through the second turbine 32 and exit the exhaust nozzle 36 to provide thrust for the engine 10.

Figure 2:
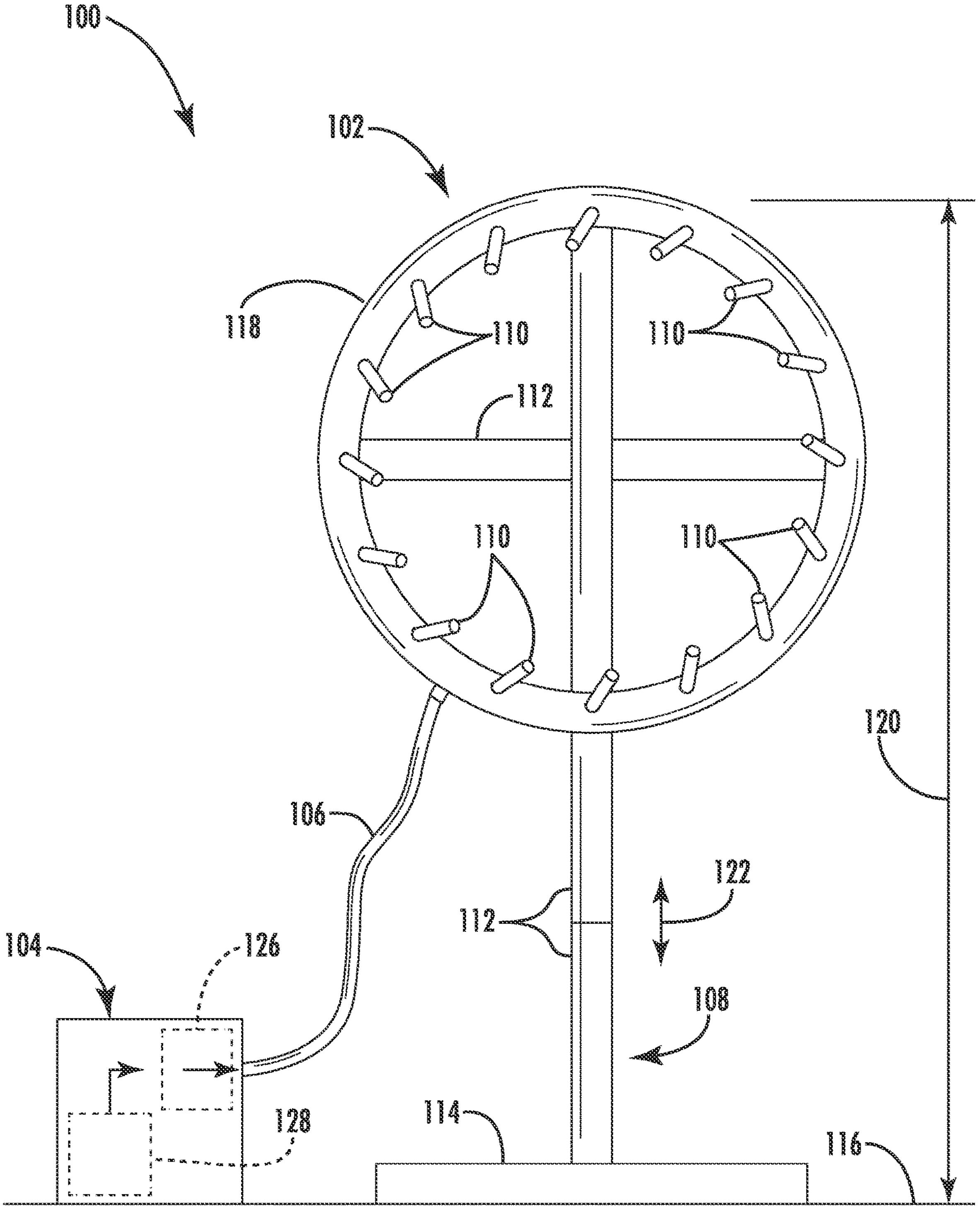
FIG. 2 illustrates a simplified view of one embodiment of a system for cleaning a gas turbine engine in accordance with aspects of the present subject matter, particularly illustrating the system including a wash stand fluidly coupled to a fluid source for supplying a cleaning fluid to a plurality of fluid injection nozzles of the wash stand.
Figure 3:
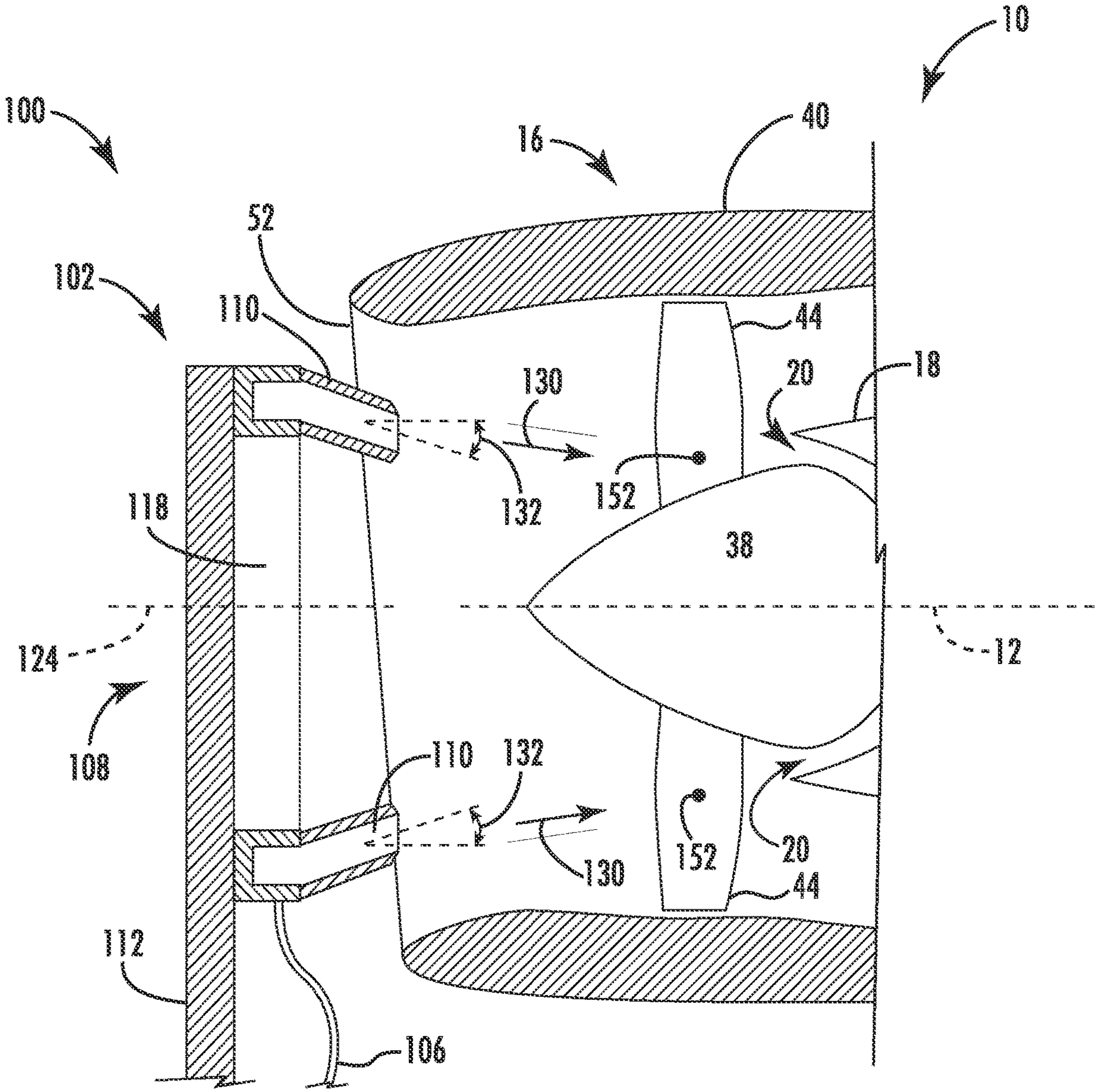
FIG. 3 illustrates a cross-sectional side view of portions of the gas turbine engine shown in FIG. 1 and the wash stand shown in FIG. 2, particularly illustrating the wash stand positioned adjacent to the axially forward end of the gas turbine engine to allow cleaning fluid to be expelled from the nozzles and into the interior of the engine.
Figure 4:
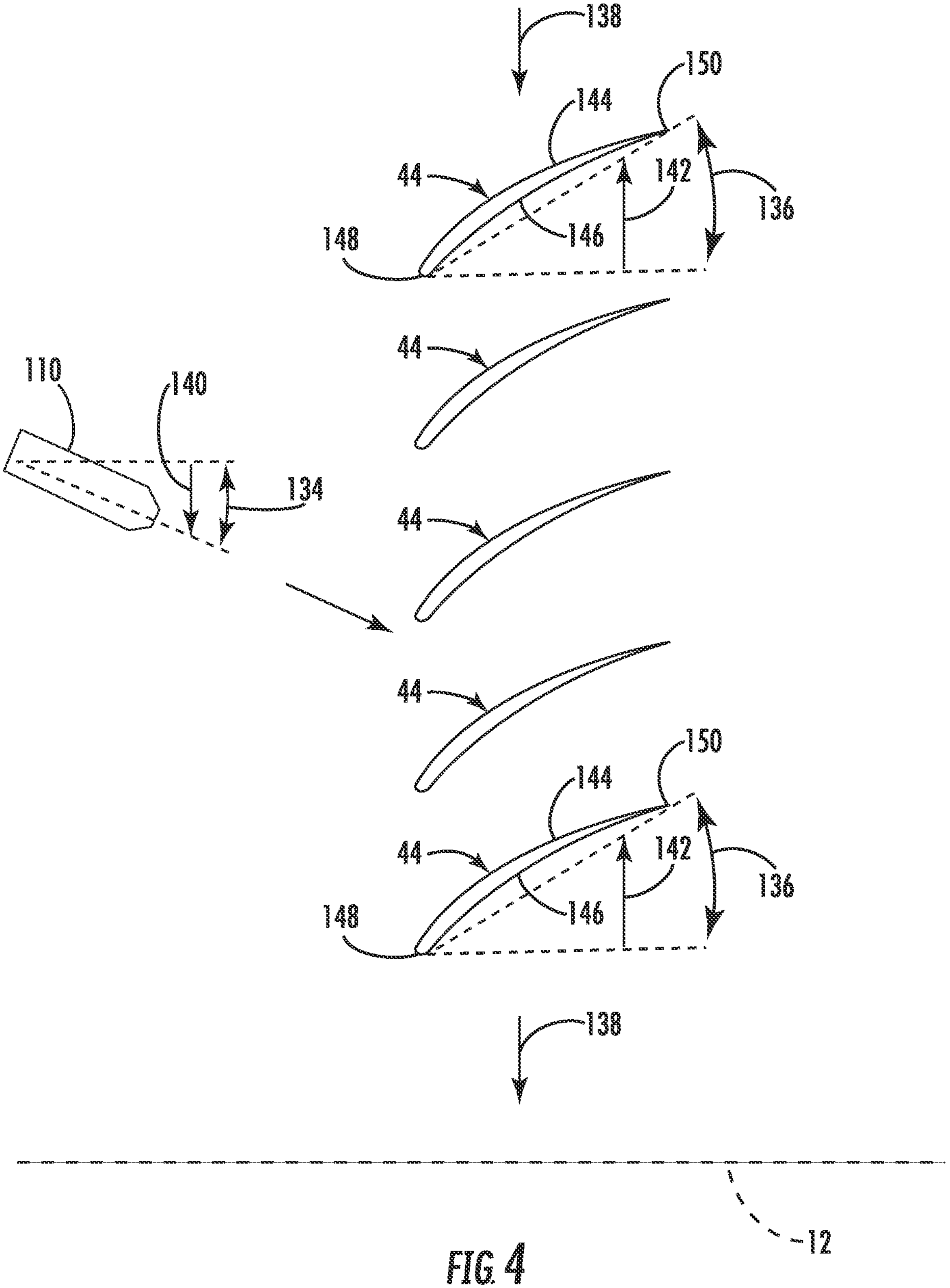
FIG. 4 illustrates a simplified, radial view of a nozzle of the disclosed wash stand and a plurality of fan blades of the gas turbine engine, particularly illustrating the differing tangential orientations of the nozzle and the fan blades relative to the engine centerline.

Referring now to FIGS. 2-4, one embodiment of a system 100 for cleaning a gas turbine engine 10 is illustrated in accordance with aspects of the present subject matter. Specifically, FIG. 2 illustrates a simplified view of a wash stand 102 and various other components of the disclosed system 100. FIG. 3 illustrates a side, cross-sectional view of portions of the gas turbine engine 10 shown in FIG. 1 and the wash stand 102 shown in FIG. 2, particularly illustrating the wash stand 102 positioned adjacent to the front or forward end of the gas turbine engine 10 to allow a cleaning fluid to be injected therein. Additionally, FIG. 4 illustrates a simplified, radial view of a nozzle 110 of the disclosed system 100 as well as a plurality of the fan blades 44 of the gas turbine engine 10, particularly illustrating the differing tangential orientations of the fan blades 44 and the nozzle 110 relative to the engine centerline 12.

As particularly shown in FIG. 2, the system 100 may include a wash stand 102 configured to be in fluidly coupled to a fluid surface 104 (e.g., via a suitable hose or fluid conduit 106). In general, the wash stand 102 may include a base frame 108 and a plurality of fluid injection nozzles 110 supported by the base frame 108. The base frame 108 may be formed from a plurality of structural members 112, 114 configured to vertically support the nozzles 110 relative to the ground 116. For example, as shown in FIG. 2, the base frame 108 may include one or more frame members 112 configured to be coupled to the nozzles 110 (e.g., via a nozzle manifold 118) and one or more stand members 114 supported on the ground 116, with the stand member(s) 114 being configured to be coupled to the frame member(s) 112 so as to maintain the base frame 108 vertically upright relative to the ground 116. In the illustrated embodiment, the stand members 114 are shown as being positioned directly onto the ground 116. However, in other embodiments, a plurality of casters or wheels may be positioned between the stand members 114 and the ground 116 to allow the wash stand 102 to be rolled across the ground 116.

It should be appreciated that the specific configuration of the base frame 108 may be selected such that a vertical height 120 of the wash stand 102 corresponds to a suitable height for aligning the nozzles 110 relative to the gas turbine engine 10. For instance, as shown in FIG. 3, the dimensions/configuration of the structural member(s) 112, 114 of the base frame 108 may be selected such that the base frame 108 is configured to support the nozzles 110 at a vertical location relative to the ground 116 that allows the nozzles 110 to be positioned adjacent to the inlet 52 of the fan casing 40 when the base frame 108 is placed on the ground 108 proximal to the front or forward end of the engine 10. In this regard, it should also be appreciated that the dimensions/configuration of the structural member(s) 12, 114 may be adjustable, as desired or as necessary, to accommodate engines located at differing vertical heights relative to the ground 116. For instance, as indicated by arrow 122 in FIG. 2, a length of one or more of the frame member(s) 112 may be varied (e.g., using a telescoping configuration) to allow the vertical height 120 of the wash stand 102 to be adjusted.

In several embodiments, the fluid injection nozzles 110 may be coupled to the base frame 108 so as to form an annular array of nozzles for injecting a cleaning fluid through the inlet 52 of the fan casing 44 and into the interior of the gas turbine engine 10. In such embodiments, the wash stand 102 may be configured to be positioned relative to the gas turbine engine 10 such that that a centerline 124 (FIG. 3) of the annular array of nozzles 110 is generally aligned with the centerline 12 of the engine 10. As such, each nozzle 110 may generally be positioned at the same radial location relative to the engine centerline 12.

As shown in FIG. 2, in one embodiment, each nozzle 110 may be coupled to the base frame 108 via a ring-shaped nozzle manifold 118, with the various nozzles 110 being spaced apart circumferentially from one another around the manifold 118. In such an embodiment, each nozzle 110 may be provided in flow communication with a fluid flow path defined within the interior of the manifold 118 such that all of the nozzles 110 are supplied with cleaning fluid via a common fluid line. For example, as shown in FIG. 2, a fluid conduit 106 may be provided between the fluid source 104 and the manifold 118. As such, cleaning fluid supplied from the fluid source 105 may be directed through the fluid conduit 106 and into the manifold 118 for subsequent delivery to each of the nozzles 110.

It should be appreciated that, in one embodiment, the manifold 118 may be configured to be separately coupled to the base frame 108, such as by welding the manifold 118 to one or more of the frame members 112 or by coupling the manifold 118 to the base frame 108 via suitable mechanical fasteners. Alternatively, the manifold 118 may be formed integrally with or otherwise form part of the base frame 108.

It should also be appreciated that the fluid source 104 may generally correspond to any suitable fluid source capable of supplying a cleaning fluid to the wash stand 102. In several embodiments, the fluid source 104 may be configured to pressurize the cleaning fluid for subsequent delivery to the nozzles 110. For instance, as shown in FIG. 2, the fluid source 104 may correspond to a mobile cleaning unit that includes a pump 126 configured to receive cleaning fluid from a tank or reservoir 128 located within the unit (or from a source external to the cleaning unit) and pressurize the fluid to a suitable fluid pressure. Specifically, in one embodiment, the cleaning fluid may be supplied to the nozzles 110 at a pressure ranging from about 60 pounds per square inch (psi) to about 900 psi, such as from about 100 psi to about 700 psi or from about 200 psi to about 400 psi and any other suitable subranges therebetween. As will be described below, such fluid pressure may be varied, as necessary or desired, to ensure that the cleaning fluid expelled from the nozzles 110 is directed past the fan blades 44 and into the compressor inlet 20. Moreover, the fluid pressure, in combination with the number and orifice size of the nozzles 110, may determine the amount of cleaning fluid injected into the engine 10. In general, it may be desirable to maximize the flow amount without inducing any operability issues, such as flameout or stall, for embodiments in which the engine is running during performance of the cleaning operation.

Additionally, it should be appreciated that the cleaning fluid used within the system 100 may generally correspond to any suitable fluid. For instance, the cleaning fluid may correspond to a liquid, gas and/or any combination thereof (e.g., foam). In a particular embodiment, the cleaning fluid may correspond to water (e.g., distilled water) or any other water-based liquid (e.g., a solution/mixture containing water and a cleaning agent or any other suitable additive).

Referring particularly to FIGS. 3 and 4, in several embodiments, the fluid injection nozzles 110 may be configured to be oriented relative to the centerline 12 of the engine 10 such that the cleaning fluid expelled from each nozzle 110 is directed through the fan casing 40 and into the compressor inlet 20. For example, each nozzle 110 may be oriented radially inwardly relative to the engine centerline 12 such that the cleaning fluid expelled from the nozzles 110 is directly along a flow path (indicated by arrows 130 in FIG. 3) having a radially inward component. Specifically, as shown in FIG. 3, each nozzle 110 may extend both axially aft and radially inwardly at a radial angle 132 defined relative to the engine centerline 12. In such an embodiment, the radial angle 132 of each nozzle 110 may be selected based on the relative radial locations of the nozzles 110 and the compressor inlet 120 to provide the desired flow path 130 for directing the cleaning fluid through the fan casing 40 and into the compressor inlet 20.

It should be appreciated that, in several embodiments, the radial orientation of the nozzles 110 may be adjustable to accommodate differing engine configurations. For example, for an engine having a smaller or larger fan rotor radius, the radial angle 132 of each nozzle 110 may be adjusted to account for the difference in the relative radial location between the nozzles 110 and the compressor inlet 20 for the smaller/larger engine. Such adjustability of the radial orientation of the nozzles 110 may be achieved using any suitable means and/or methodology. For instance, in one embodiment, the nozzles 110 may be movably coupled to the manifold 118 (e.g., via a pivotal or hinged coupling) to allow the orientation of each nozzle 110 relative to the manifold 118 be adjusted. Alternatively, the nozzles 110 may be removably coupled to the manifold 118. In such instance, when nozzles 110 having a differing radial orientation are desired to be installed on the wash stand '01, the existing nozzles 110 may be removed and replaced with nozzles 110 having the desired radial orientation.

Additionally, as shown in FIG. 4, the nozzles 110 may be oriented circumferentially or tangentially relative to the engine centerline 12 to allow the cleaning fluid to be injected past the fan blades 44 and into the compressor inlet 20 as the fan blades 44 are being rotated during operation of the engine 10. Specifically, in several embodiments, each nozzle 110 may be configured to expel cleaning fluid at a tangential angle 134 that is oriented in the opposite direction as the corresponding pre-defined stagger angle 136 of the fan blades 44. For example, as shown in FIG. 4, each nozzle 110 may be oriented at a positive tangential angle 134 relative to the engine centerline 12 whereas each fan blade 44 may define a stagger angle 136 relative to the engine centerline 12 corresponding to a negative tangential angle. As used herein, the terms "positive tangential angle" and "negative tangential angle" are used to differentiate tangential angles defined relative to the rotational direction of the fan blades 44 (indicated by the arrows 138 in FIG. 4). For example, as shown in FIG. 4, the tangential angle 134 of the nozzle 110 is defined as positive since the tangential component of the angle 134 (indicated by arrow 140) is directed in the same direction as the rotational direction 138 of the fan blades 44. In contrast, the stagger angle 136 of each fan blade 44 is defined as a negative tangential angle since the tangential component of the angle 136 (indicated by arrows 142) is directed in the opposite direction of the rotational direction 138 of the fan blades 44.

It should be appreciated that the stagger angle 136 generally corresponds to the angle defined between a reference line extending parallel to the engine centerline 12 and a straight line connecting the leading and trailing edges of the fan blade 44. For example, as shown in FIG. 4, each fan blade 44 may include a pressure side 144 and a suction side 146 extending between a leading edge 148 and a trailing edge 150. As shown in the illustrated embodiment, the leading edge 148 of each fan blade 44 "leads" or is ahead of the trailing edge 150 in the rotational direction 138 of the fan blades 44, thereby defining the negative stagger angle 136.

It should be appreciated that the stagger angle 136 of the fan blades 44 may generally vary as each fan blade 44 extends radially outwardly towards the fan casing 40. However, in a particular embodiment, the stagger angle 136 of each fan blade 44 at the radial location at which the cleaning fluid is being injected past the fan blades 44 (e.g., radial locations 152 shown in FIG. 3) may generally range from less than zero degrees to about −60 degrees, such as from about −10 degrees to about −50 degrees or from about −20 degrees to about −40 degrees and any other subranges therebetween.

Additionally, it should be appreciated that the tangential angle 134 associated with each nozzle 110 as well as the pressure of the cleaning fluid supplied to the nozzles 110 may generally be selected so as to ensure that the cleaning fluid is expelled from the nozzles 110 at a suitable fluid velocity and tangential orientation for allowing all or a significant portion of the fluid to be directed between the rotating fan blades 44 and into the compressor inlet 20. In this regard, the tangential angle 134 and fluid pressure required to achieve such a result may vary depending on the engine configuration, namely the stagger angle 134 of the fan blades 44 and the fan rotor radius, as well as the rotor speed at which the fan blades 44 are being rotated during the performance of the cleaning operation. Thus, in several embodiments, the tangential orientation of the nozzles 110 and/or the pressure of the cleaning fluid supplied to the nozzles 110 may be adjusted to provide the desired flow characteristics for the cleaning fluid being expelled from the nozzles 110. For instance, in one embodiment, the tangential orientation of the nozzles 110 may be fixed relative to the manifold 118. In such an embodiment, the pressure of the fluid supplied to the nozzles 110 may be adjusted, as necessary, such that the fluid velocity of the cleaning fluid expelled from the nozzles 110 is sufficient to allow the cleaning fluid to be injected past the rotating fan blades 44 and into the compressor inlet 20. Alternatively, the tangential orientation of the nozzles 110 may be adjustable relative to the manifold 118, such as by providing a pivotal or hinged connection between the nozzles 110 and the manifold 118. In such instance, the tangential orientation of the nozzles 110 may be adjusted, either alone or in combination with corresponding pressure adjustments, to ensure that the cleaning fluid is directed between the fan blades 44 and into the compressor inlet 20.

As indicated above, the tangential angle defined by the nozzles 110 may need to be varied as a function of numerous turbine parameters, including the rotor speed of the engine 10 during the performance of the cleaning operation. However, in general, the tangential angle 134 defined by each nozzle 110 may vary from greater than zero degrees to about 60 degrees when the engine is operating at a minimum rotor speed or higher (e.g., a rotor speed equal to greater than a rotor speed associated with a dry motoring speed, an idle speed and/or a partial throttle speed for the associated engine 10), such as a tangential angle ranging from about 10 degrees to about 50 degrees or from about 20 degrees to about 40 degrees and/or any other subranges therebetween.

Additionally, it should be appreciated that, in several embodiments, the tangential orientation and/or radial orientation of the nozzles 110 may be adjusted as a function of the rotor speed at which the engine is running during performance of the cleaning operation. For instance, the nozzles 110 may be configured to be set at a predetermined tangential angle 134 and/or a predetermined radial angle 132 based on the rotor speed at which the engine is being operated. Such an adjustment to the orientation of the nozzles 110 may be made independent of or in combination to any angular adjustments due to the engine radial size. For example, in one embodiment, the nozzles 110 may be configured to be set at a predetermined tangential angle 134 and/or a predetermined radial angle 132 based on a combination of the rotor speed and the fan radius.

Figure 5:
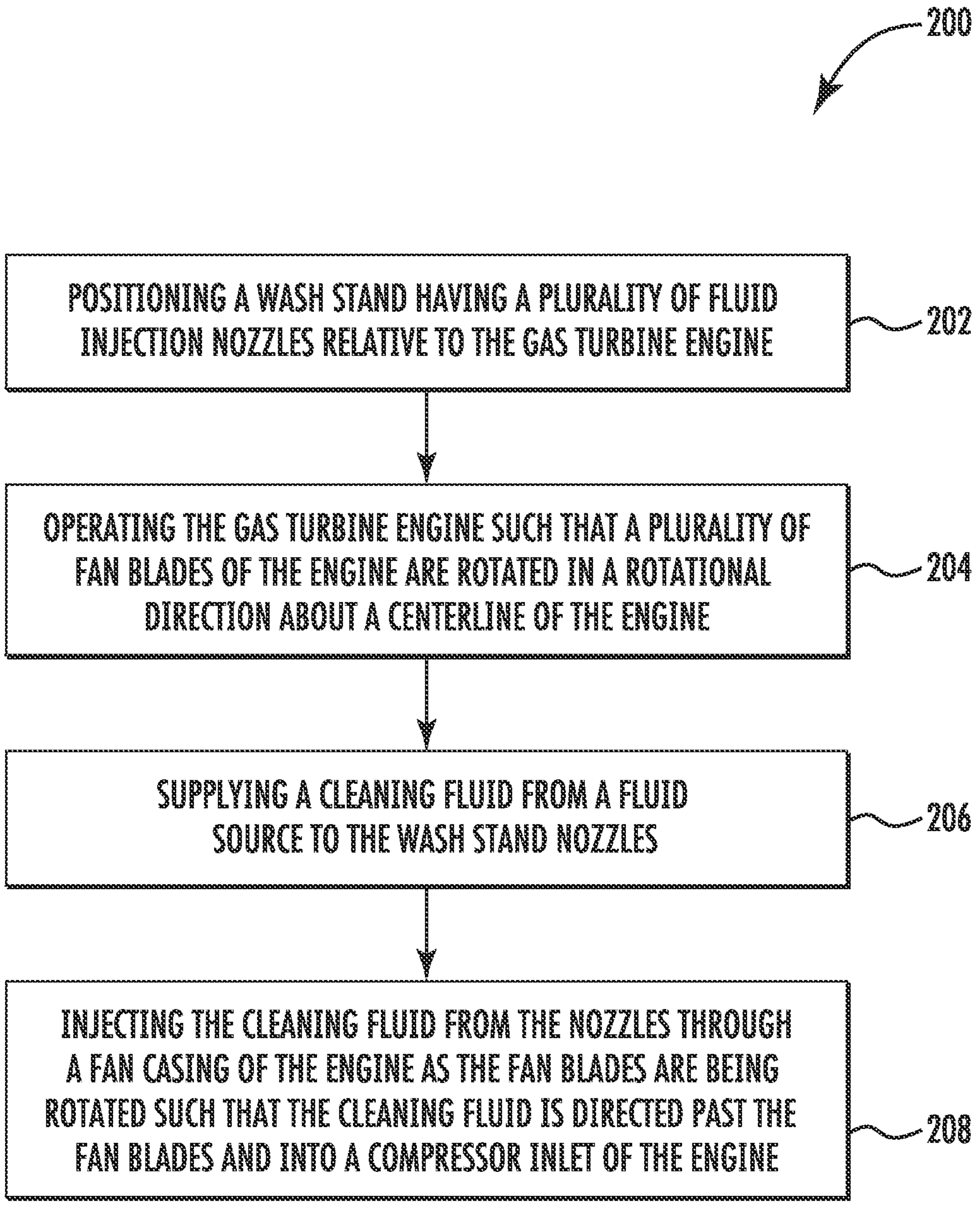
FIG. 5 illustrates a flow diagram of one embodiment of a method for cleaning a gas turbine engine in accordance with aspects of the present subject matter.

Referring now to FIG. 5, a flow diagram of one embodiment of a method 200 for cleaning a gas turbine engine is illustrated in accordance with aspects of the present subject matter. In general, the method 200 will be discussed herein with reference to the gas turbine engine 10 described above with reference to FIG. 1 and the system 100 described above with reference to FIGS. 2-4. However, it should be appreciated by those of ordinary skill in the art that the disclosed method 200 may generally be implemented with gas turbine engines having any other suitable engine configuration and/or with systems having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include positioning a wash stand having a plurality of fluid injection nozzles relative to the gas turbine engine. For example, the disclosed wash stand 102 may be positioned adjacent to the front or forward end of the gas turbine engine 10 such that the nozzles 110 are configured to inject cleaning fluid through the fan casing 40 of the engine 10. As described above with reference to FIG. 3, in one embodiment, the wash stand 102 may be positioned relative to the gas turbine engine 10 such that the centerline 124 of the annular array of nozzles 110 is generally aligned with the engine centerline 12. It should be appreciated that the wash stand 102 may be positioned relative to the engine 10 by moving the wash stand 102 relative to the engine 10 or by moving the engine 10 relative to the wash stand 102.

Additionally, as (204), the method 200 may include operating the gas turbine engine such that a plurality of fan blades of the engine are rotated in a rotational direction about the engine centerline. Specifically, as indicated above, the engine 10 may be running during the performance of the disclosed cleaning methodology, which may allow the cleaning fluid expelled from the nozzles 110 to be both heated and pressurized as the fluid is directed through the engine core 14. In several embodiments, the gas turbine engine 10 may be operated at an operational speed at or above a minimum threshold speed for the engine 10. For instance, the minimum threshold speed may correspond to a rotor speed that is equal to or greater than a rotor speed associated with a dry motoring speed, an idle speed and/or a partial throttle speed for the associated engine 10.

Referring still to FIG. 5, at (206), the method 200 may include supplying a cleaning fluid from a fluid source to the nozzles of the wash stand. Specifically, as indicated above, the wash stand 102 may be fluidly coupled to a suitable fluid source 104 (e.g., a mobile cleaning unit). As such, cleaning fluid may be directed from the fluid source 104 to the wash stand 102 (e.g., via a suitable fluid conduit 106). Additionally, as described above with reference to FIGS. 2 and 3, the various nozzles 110 may, in one embodiment, be fluidly coupled to a common nozzle manifold 118. In such an embodiment, the cleaning fluid supplied from the fluid source 104 may be directed into the manifold 118 for subsequent delivery to the nozzles 110.

Moreover, at (208), the method 200 may include injecting the cleaning fluid from the nozzles through a fan casing of the engine as the fan blades are being rotated such that the cleaning fluid is directed past the fan blades and into a compressor inlet of the engine. Specifically, as indicated above, the radial and/or tangential orientation of the nozzles relative 110 to the engine centerline 12 may be selected such that the cleaning fluid expelled from the nozzles 110 is directed between the rotating fan blades 44 and into the compressor inlet 20. For instance, as described above with reference to FIG. 4, the nozzles 110 may be oriented at a positive tangential angle 134 relative to the engine centerline 12 (as opposed to the negative tangential or stagger angle 136 of the fan blades 44) to ensure that the cleaning fluid is directed at a suitable trajectory to allow the fluid to be injected unabated through the fan blades 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cleaning system for a gas turbine engine comprising:

a washer including a first set of nozzles locatable adjacent to a gas turbine engine, the first set of nozzles arranged about a centerline;

a cleaning fluid in fluid communication with the first set of nozzles for discharge into a gas turbine engine as a plurality of fan blades rotate in a rotational direction relative to the centerline, the cleaning fluid being supplied at a pressure; and each nozzle of the first set of nozzles being upstream of the plurality of fan blades of the gas turbine engine and oriented at a first positive tangential angle defined relative to a rotational direction of the plurality of fan blades, the first positive tangential angle having a first axial component along the centerline and a first rotational component relative to a rotational direction of a plurality of fan blades, the first positive tangential angle and/or the pressure being determined from a rotational speed of the plurality of fan blades during cleaning such that at least a majority of the cleaning fluid passes through the plurality of fan blades unbated by the plurality of fan blades into a compressor inlet of the gas turbine engine while the plurality of fan blades are rotating.

2. The cleaning system of claim 1 wherein the first positive tangential angle ranges from greater than zero degrees to 60 degrees.

3. The cleaning system of claim 1 wherein each nozzle of the first set of nozzles is oriented radially inwardly relative to the centerline.

4. The cleaning system of claim 1 wherein the cleaning fluid is in fluid communication with the first set of nozzles at a pressure ranging from 60 psi to 900 psi.

5. The cleaning system of claim 1 wherein the washer further comprises a base frame and the first set of nozzles being coupled to the base frame to form an annular array about the centerline.

6. The cleaning system of claim 5 wherein the first set of nozzles is coupled to the base frame via a ring-shaped nozzle manifold.

7. The cleaning system of claim 1 wherein the first positive tangential angle of at least one of the nozzles of the first set of nozzles is adjustable.

8. The cleaning system of claim 1 wherein the first positive tangential angle of at least one of the nozzles of the first set of nozzles is adjustable based on the rotational speed of a gas turbine engine.

9. The cleaning system of claim 1 wherein the washer is moveable to align the centerline with a rotational axis of a gas turbine engine.

10. The cleaning system of claim 1 wherein the cleaning fluid is heated.

11. The cleaning system of claim 1 wherein the cleaning fluid is supplied from a mobile source.

12. The cleaning system of claim 1 comprising a second set of nozzles being interchangeable with the first set of nozzles, each nozzle of the second set of nozzles having a second positive tangential angle defined relative to a rotational direction of a plurality of fan blades being different than the first tangential angle of the first set nozzles, the second positive tangential angle having a second axial component along the centerline and a second rotational component relative to a rotational direction of a plurality of fan blades.

13. A cleaning system for a gas turbine engine comprising:

a washer including a plurality of nozzles locatable adjacent to a gas turbine engine, the plurality of nozzles arranged about a centerline;

a cleaning fluid in fluid communication with the plurality of nozzles for discharge into a gas turbine engine as a plurality of fan blades rotate in a rotational direction relative to the centerline; and each nozzle being upstream of the plurality of fan blades of the gas turbine engine and oriented at a positive tangential angle defined relative to a rotational direction of a plurality of fan blades, at least one of a tangential orientation or a radial orientation of at least one of the plurality of nozzles being adjustable relative to the centerline, the positive tangential angle being determined from a rotational speed of the plurality of fan blades during cleaning such that at least a majority of the cleaning fluid passes through the plurality of fan blades unbated by the plurality of fan blades into a compressor inlet of the gas turbine engine while the plurality of fan blades are rotating.

14. The cleaning system of claim 13 wherein at least one of the tangential orientation or the radial orientation of at least one of the plurality of nozzles being adjustable relative to the centerline based on a speed of rotation of a plurality of fan blades.

15. The cleaning system of claim 13 wherein at least one of the tangential orientation or the radial orientation of at least one of the plurality of nozzles being adjustable relative to the centerline while cleaning fluid is being discharged from the plurality of nozzles.

16. The cleaning system of claim 13 wherein at least one of the tangential orientation or the radial orientation of at least two of the plurality of nozzles being different.

17. The cleaning system of claim 13 wherein the positive tangential angle ranges from greater than zero degrees to 60 degrees.

18. The cleaning system of claim 13 wherein each nozzle of the plurality of nozzles is oriented radially inwardly relative to the centerline.

19. The cleaning system of claim 13 wherein the cleaning fluid is in fluid communication with the plurality of nozzles at a pressure ranging from 60 psi to 900 psi.

* * * * *